(12) United States Patent
Deco

(10) Patent No.: US 6,386,498 B1
(45) Date of Patent: May 14, 2002

(54) ELEVATED PLATTER FOR PREPARING FOOD IN A MICROWAVE OVEN

(76) Inventor: Kelly Deco, 1500 Silverwood, Los Angeles, CA (US) 90041

( * ) Notice: Subject to any disclaimer, the term of this patent is extended or adjusted under 35 U.S.C. 154(b) by 0 days.

(21) Appl. No.: 09/443,058

(22) Filed: Nov. 18, 1999

(51) Int. Cl.$^7$ .............................. A47B 91/00; H05B 6/80
(52) U.S. Cl. ................... 248/346.01; D7/409; 219/729; 219/732; 219/755
(58) Field of Search ................... 248/346.01, 346.5, 248/349.1; D7/505, 409; 211/128.1; 99/450; 219/732, 755, 729

(56) References Cited

U.S. PATENT DOCUMENTS

| | | | | |
|---|---|---|---|---|
| 903,377 A | * | 11/1908 | Hebestreit | 294/144 |
| D152,558 S | * | 2/1949 | Paolino | D7/505 |
| 3,115,253 A | * | 12/1963 | Malbin et al. | 211/128.1 |
| 3,858,529 A | * | 1/1975 | Salladay | 108/103 |
| D251,107 S | * | 2/1979 | Ottier | D7/409 |
| 4,249,464 A | * | 2/1981 | Hansen | 99/450 |
| D278,306 S | * | 4/1985 | McIntosh | D7/409 |
| 4,539,455 A | * | 9/1985 | Colato et al. | 219/732 |
| D286,129 S | * | 10/1986 | Bowen et al. | D7/409 |
| 4,713,513 A | * | 12/1987 | Colato | 219/755 |
| 4,847,461 A | * | 7/1989 | Gilmore | 219/732 |
| 5,247,149 A | * | 9/1993 | Peleg | 219/729 |
| 5,726,428 A | * | 3/1998 | Christensen | 219/754 |

\* cited by examiner

Primary Examiner—Anita King
(74) Attorney, Agent, or Firm—Squire, Sanders & Dempsey LLP.; David B. Abel

(57) ABSTRACT

A platter for within an oven such as a microwave is provided to hold large food plates or prepackaged meals, such as a pizza. One large dish would be placed below the platter base and one would be placed on the platter base. The platter has three support posts attached to the edge of and elevating a platter base. Two of the support posts are positioned close to the diametrical center creating a large open area for the insertion or removal of large plates of food such as a pizza. The oven or platter may include a base that rotates so that the platter would be placed on the base so that both dishes would rotate. Two large food plates or prepackaged meals may be heated for different periods of time, with the insertion or removal of either plate not requiring the removal of the platter. The platter for large food plates or prepackaged meals is stackable for multiplate cooking of as many large plates of food and prepackaged meals as oven space permits.

1 Claim, 3 Drawing Sheets

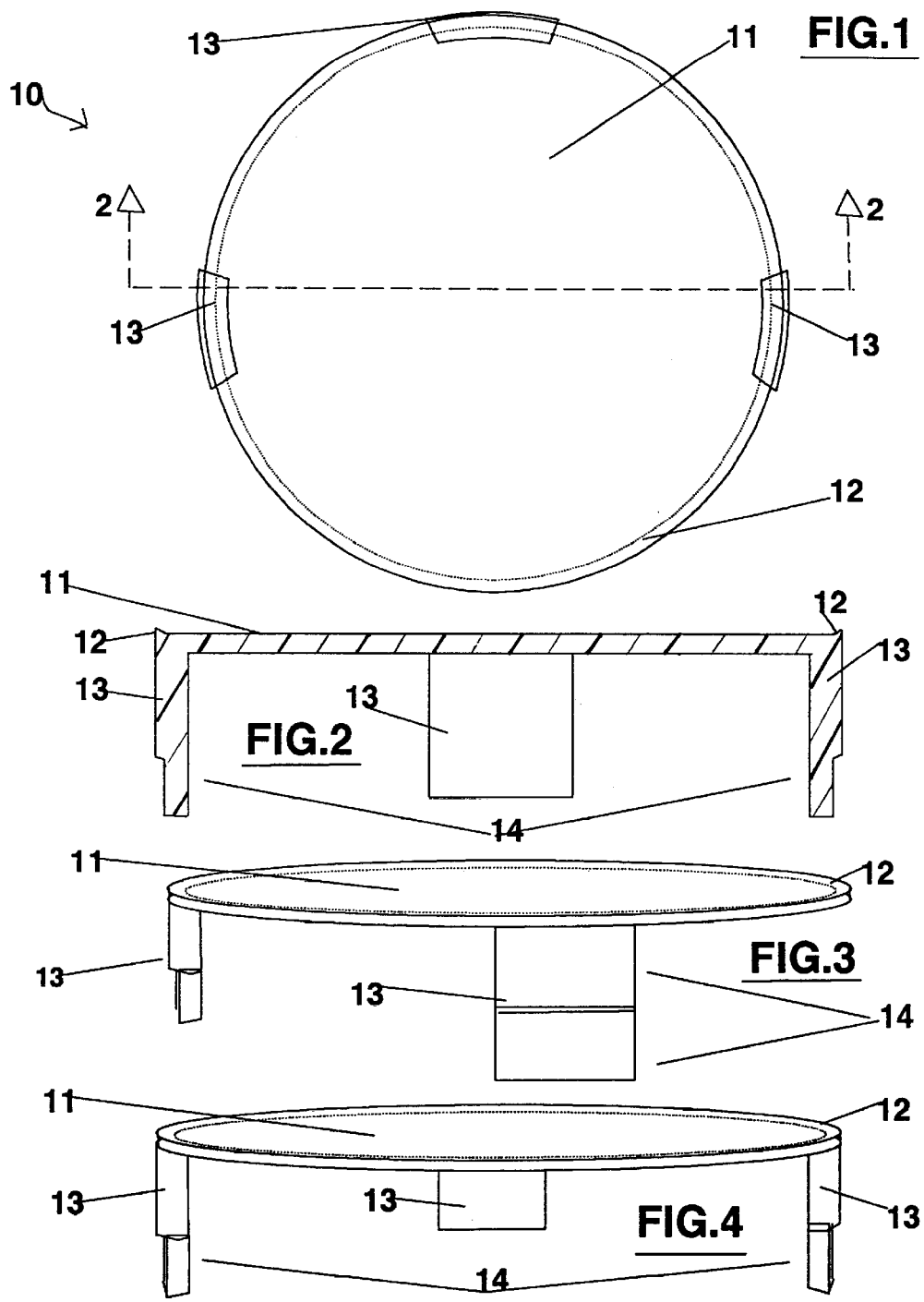

ELEVATED PLATTER FOR PREPARING FOOD IN A MICROWAVE OVEN

BACKGROUND OF THE INVENTION

1. Field of the Invention

The present invention relates to an elevated platter to allow for the simultaneous preparation of two large plates or large prepackaged meals, such as pizzas, in a microwave oven. The elevated platter is designed to be placed in the interior of the microwave oven to provide an elevated plate to support a second or other additional large plate or large prepackaged meal above a first container so that the operative capacity of the microwave oven is duplicated with the consequent economy in time and power consumption.

2. Description of Related Art

Many microwave ovens incorporate a rotating circular plate which is used as a support means for a dish or cookware containing the foods to be cooked. In operation, the microwave emits radiant energy within its cooking chamber which heats food items placed or contained therein, causing the food to become warm and therefore to be cooked. The microwave oven may further incorporate a timing selector, operable by the user, which acts on a timer for allowing the user to determine the cooking time and permits different cooking options provided by the microwave oven.

There are a few types of supports that may be placed on the internal rotating plate of the microwave oven to allow the possibility of simultaneous cooking two different dishes, one of them disposed on the rotating plate of the oven and the other on the support as shown for example in U.S. Pat. No. 4,593,171. However, the prior supports are accompanied by considerable drawbacks which limit their use, because in order to take out the dish located on the rotating plate of the oven, it is first necessary to withdraw the support with the dish, or use a dish or plate limited to a size that fits into a notch at both sides of the support platform.

Accordingly, it would be desirable to provide an elevated platter that fits within a microwave oven that can hold a large plate or prepackaged meal above a second large plate or prepackaged meal. The elevated platter would allow the plates to be inserted or removed from the oven without having to remove the elevated platter, tip the plates, or require special plates to work in conjunction with the elevated platter.

SUMMARY OF THE INVENTION

An elevated platter for an additional large plate or large prepackaged meal, such as a pizza in a microwave oven, according to the present invention advantageously overcomes the problems outlined above. The elevated platter allows unobstructed access to a large plate or a large prepackaged meal, such as a pizza, located on the rotating plate of the microwave oven as well as to the large plate or large prepackaged meal such as a pizza placed on top of the elevated platter. The elevated platter allows the operative oven capacity to be doubled.

The elevated platter includes a generally circular plate having a peripheral ridge. The elevated platter has three rectangular "posts" to raise the circular plate a certain height. The posts are curved to match the curve of the circular plate and extend downward perpendicular from the outer edge of the circular plate. Two of the posts are positioned closer to the diametrical center and are useable as left and right supporting posts so as to leave a large open space in one side for use as the front access. With this configuration, a dish or container for foods to be cooked, including larger plates of food and prepackaged meals such as a pizza, can be placed on the circular plate directly above the rotating circular base of the microwave oven, on which may also be placed another dish containing other foods, of same large-sized meal proportions or smaller, for simultaneous cooking. The dishes may be removed separately or simultaneously due to the large open front-space created between the left and right support posts. The elevated platter may further include a rotating base or may be constructed to rest on an oven's rotating plate so that the platter will rotate with the rotating base or plate.

The present invention substantially increases microwave oven capacity and ease of use, without the access and size restrictions of currently available supports. Thus, the present invention constitutes an innovation in the field of small electric home appliances and, in particular in the field of wares or set of utensils, and is applicable at a domestic level as well as at an industrial level.

A more complete understanding of the elevated platter will be afforded to those skilled in the art, as well as a realization of additional advantages and objects thereof, by a consideration of the following detailed description of the preferred embodiment. Reference will be made to the appended sheets of drawings that will first be described briefly.

BRIEF DESCRIPTION OF THE DRAWINGS

In the drawings accompanying the present description, the present invention has been represented, by way of example and therefore without any limited character, a preferred embodiment of the present invention.

FIG. 1 shows a top view of the elevated platter in accordance with a first embodiment of the present invention;

FIG. 2 shows a cross-sectional side view of the elevated platter of FIG. 1 taken along the section 2—2 of FIG. 1;

FIG. 3 shows an elevated side view of the elevated platter in accordance with the first embodiment of the present invention;

FIG. 4 shows an elevated front view of the elevated platter in accordance with the first embodiment of the present invention;

DETAILED DESCRIPTION OF THE PREFERRED EMBODIMENT

Figure 5:
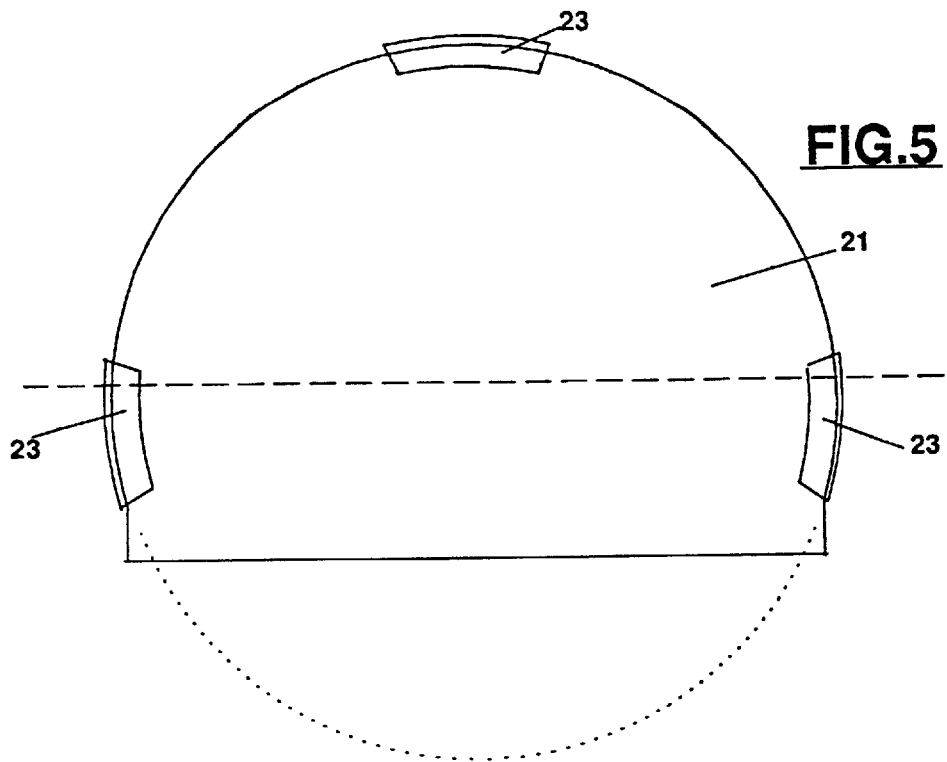
FIG. 5 shows a top view of an elevated platter in accordance with a second embodiment of the present invention.

In the detailed description that follows, it should be appreciated that like reference numerals are used to identify like elements illustrated in one or more of the figures.

Referring first to FIGS. 1–4, an elevated platter 10 for use in a microwave oven in accordance with a first embodiment of the present invention is illustrated. The elevated platter 10 has a generally circular flat plate 11, delimited by an inwardly sloping peripheral ridge or strip 12, which has a height slightly greater than the height of the circular flat plate 11. On three sides and in a downward direction there are three posts 13, with a predetermined length, which are perpendicular to the circular flat plate 11. Two of the posts 13 are positioned closer to the diametrical center so as to create a large open area for insertion or removal of large plates of food. The third post 13 is positioned at the rear of the platter 10. This is illustrated in FIG. 2 that shows a cross-sectional side view taken along the section 2—2 of FIG. 1 as well as in the elevated side and front views of FIGS. 3 and 4, respectively.

The posts 13 have the double task of serving as supporting feet for the elevated platter 10 of the present invention and provide an opening for a dish that can be placed below the circular flat plate 11. The dish below the circular flat plate 11 may be located on a rotating plate of the oven which will remain housed in a space 14 located under the circular flat plate 11 and between the posts 13. The dish or recipient for containing food that is placed on the elevated platter 10 of the present invention, will lie directly on the circular flat plate 11, such that the perimetrical strip 12 is positioned at a greater height than the height of the circular flat plate 11 and will serve as a spill trap against any undesired leakage from the dish.

As can be readily understood from the drawings, especially from FIG. 2, inserting or removing a large dish or prepackaged microwave meals, such as pizza, under the circular flat plate 11 once the preparation of the foods contained in said dish has ended, is completely unobstructed because the posts 13 offer an open expanse to allow the dish to be withdrawn from the space 14, without any obstructive inconvenience. Consequently, it is not necessary to remove the elevated platter 10 in order to gain access to the space 14 created under the elevated platter 10. Furthermore, a large dish or prepackaged meal may also be placed on the circular flat plate 11 of the elevated platter 10, or removed, without disturbing the dish located in the space 14.

It should be understood that the circular flat plate 11 of the elevated platter 10 may be circular as shown in FIGS. 1–4 or may be of various other shapes depending upon customer preference and the shape of the intended microwave oven that the elevated platter 10 will be used in. Additionally, three posts 13 are shown to provide a desired height to the circular flat plate 11, but any number of posts may be utilized depending upon the shape of the base, weight of the dish to be supported, and stability desired of the elevated platter 10.

In an alternate form, FIG. 5 shows a top view of an elevated platter 21 for an additional dish in accordance with a second embodiment of the present invention. Three support posts 23 are shown, with two support posts 23 positioned close to the diametrical center. The elevated platter 21 is shaped as a part semi-circle above a square to define a shape similar to that of a basketball backboard.

Figure 6:
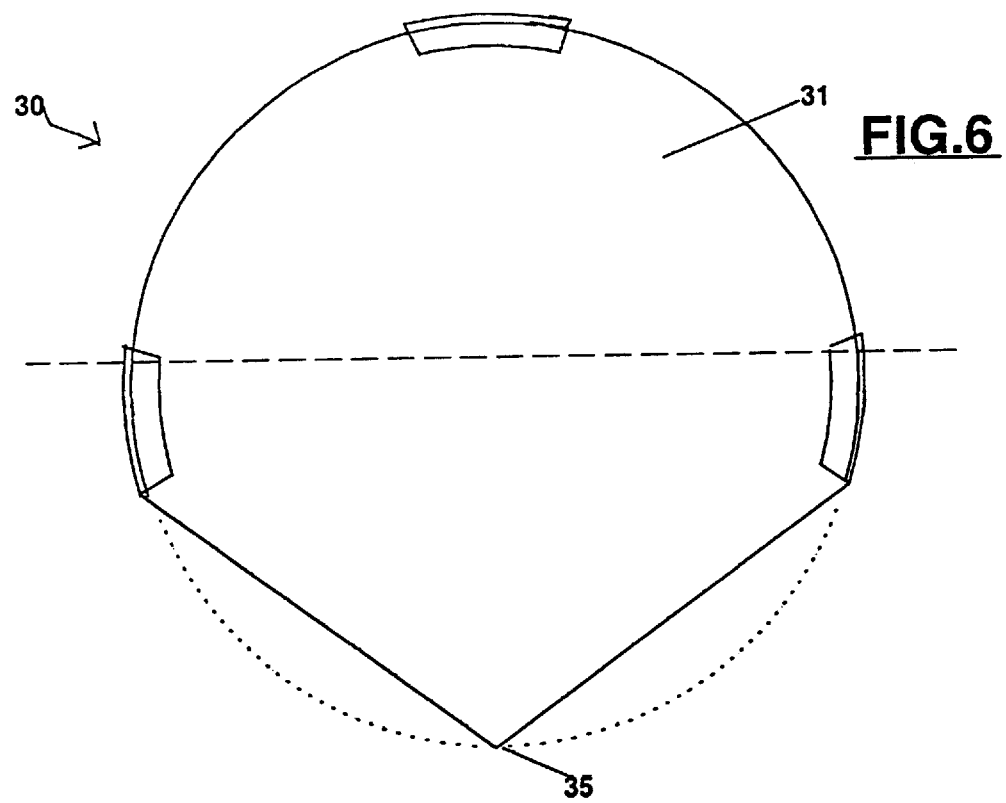
FIG. 6 shows a top view of an elevated platter in accordance with a third embodiment of the present invention.
Figure 7:
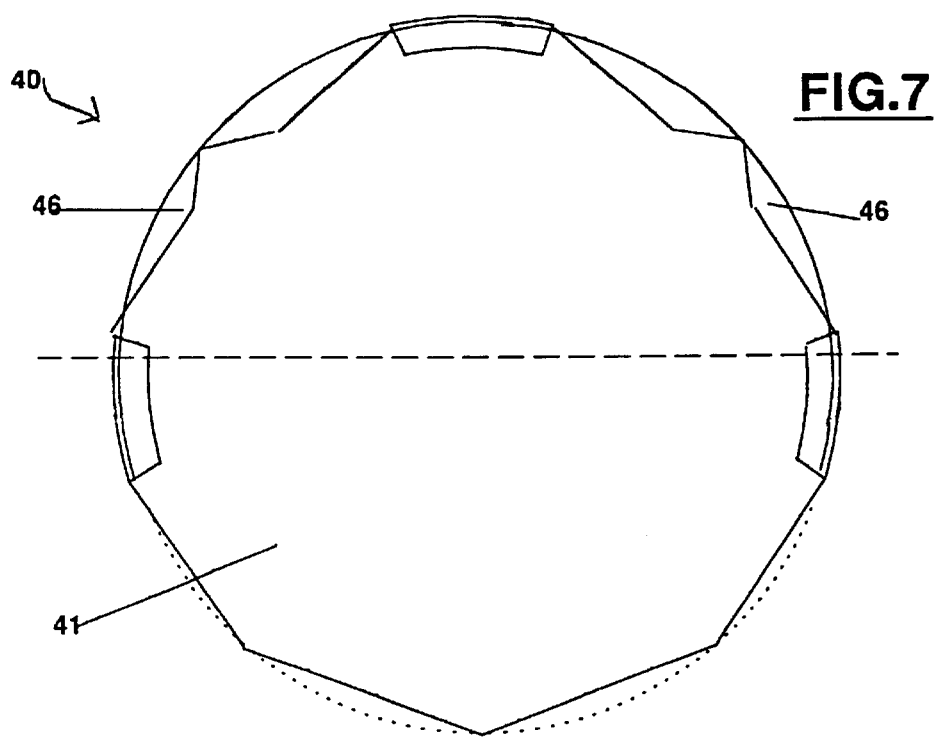
FIG. 7 shows a top view of an elevated platter in accordance with a fourth embodiment of the present invention.
Figure 8:
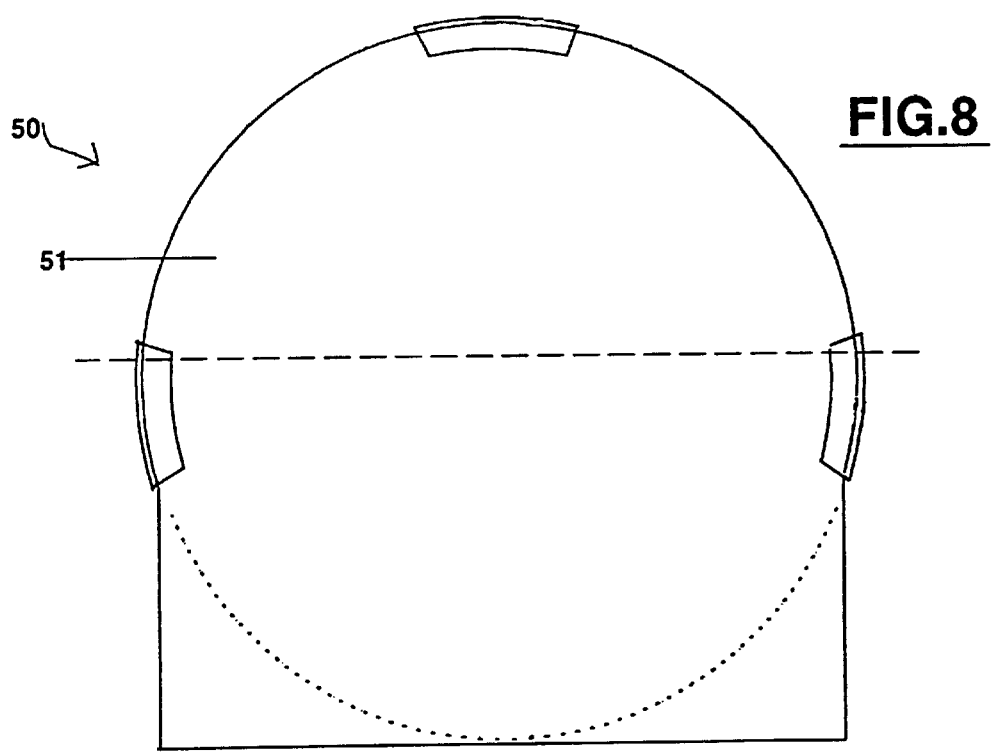
FIG. 8 shows a top view of an elevated platter in accordance with a fifth embodiment of the present invention.

FIGS. 6–8 also show alternative shapes for the elevated platters according to the invention. FIG. 6 shows a top view of an elevated platter 30 for an additional dish in accordance with a third embodiment of the present invention. A base 31 is semi-circular with the front forming a point 35. FIG. 7 shows a top view of a platter 40 for an additional dish in accordance with a fourth embodiment of the present invention. A base 41 is shaped partially semi-circular and partially shaped, for example, like an octagon. The base 41 also has a series of serrated edges 46 along its perimeter. FIG. 8 shows a top view of a platter 50 for an additional dish in accordance with a fifth embodiment of the present invention. A base 51 is partially semi-circular and partially square or rectangular to provide additional support for the dish placed on the base 51.

As should be understood from the description of the embodiment above, the platter base may be modified to resemble any number of geometric shapes, such as a star, a pentagon, an octagon, etc., as long as the shape will fit within the space of the oven and be supported on a plurality of posts, such as three posts, and be positioned to allow access to a dish below the platter base. The supporting leg located at the back of the platter could be made heavier or weighted for additional front end stability if needed, and the side legs could be made to extend further toward the front end of the platter to ensure additional stability.

As should be clear to one skilled in the art, the platter of the present invention permits cooking simultaneously two large size dishes with different foods and prepackaged meals even if each food within the dishes require a different cooking time. In effect, by programming the microwave for the shortest cooking time, once the time is elapsed, the dish whose preparation is ended can be withdrawn. The oven is then programmed again for the time required to end preparation of the food within the second dish. Additionally, once the first dish has been withdrawn, a new dish may be introduced to replace the dish that was withdrawn, for simultaneous preparation during the remainder of the time to finish the preparation of the foods contained in the second dish.

The platter of the present invention also offers a safety advantage for cooking of multiple large plates of food and prepackaged meals by removing the danger of plate tipping or spilling while removing hot plates of food from the rotating circular base. The platter of the present invention makes best use of current microwave oven space and can be stacked to allow for as many meals as future microwave oven space will allow.

Other features and advantages provided by the present invention will become evident to one skilled in this art. By way of example, it can be mentioned the ease for cleaning the platter of the invention by virtue of its configuration, as well as ease of storage. It is to be understood that the invention will be subject to variations in the size or material used for its manufacture, without this fact involving any alteration in, the scope of the invention.

In a preferred embodiment, a platter is provided having a circular flat base and an inwardly sloping perimetrical external strip. The strip is located slightly above the circular flat base. The platter has three support posts near the edge of the circular flat base, with two posts positioned near the diametrical center to create an open space for easy insertion and removal of dishes below the circular flat base. The third support post is positioned near the rear of the circular flat base. The platter is designed to double the capacity of an oven, such as a microwave oven, by allowing the cooking of two large plates or large prepackaged meals simultaneously. The platter allows the insertion or removal of a dish below the circular flat base and the insertion or removal of a dish placed on the circular flat base. The oven may also have a rotating circular plate that is designed to hold one dish. The platter may be placed on this rotating circular plate so that the platter rotates with the rotating circular plate and doubles the capacity of the oven while ensuring the even cooking of the food within both dishes. Therefore, the platter allows the cooking of twice the number of dishes without introducing size limitations or creating the danger of tipping and spilling of hot food or liquids during the placement or removal of the container within the oven.

The preferred method of fabrication would be from a two-part mold process where liquid glass or plastic resin is poured into a mold and allowed to harden and cool. When complete the product is removed from the two-part mold and packaged. Alternatively, the product could be pressed from a large single sheet of molded plastic, which would lower the manufacturing cost significantly.

Having thus described a preferred embodiment of the elevated platter, it should be apparent to those skilled in the art that certain advantages of the within system have been achieved. It should also be appreciated that various modifications, adaptations, and alternative embodiments thereof may be made within the scope and spirit of the present invention. For example, the elevated platter has been illustrated, but it should be apparent that the inventive concepts described above would be equally applicable to other shapes for the elevated platter. Accordingly, the scope of the invention is intended to be limited and/or defined only by the proper interpretation of the following claims.

What is claimed is:

1. An elevated platter for supporting a dish within an oven, comprising:

a plate adapted to hold the dish; and a plurality of support posts coupled to said plate and adapted to elevate said plate to a certain height, wherein said plurality of support posts are spaced to provide an opening sufficient for the insertion or removal of a second dish below said plate and, wherein said plate further comprises two halves, a first half being semicircular and a second half being triangular, wherein said first half and said second half are coupled together to form a flat surface.

* * * * *